Sept. 24, 1957 A. J. BUTTERWORTH 2,807,340
CHANGE-SPEED GEARS FOR AUTOMOBILES
Filed March 20, 1953 6 Sheets-Sheet 2

FIG. 2.

Inventor
Archibald J. Butterworth
By
Young, Emery & Thompson
Attys.

Sept. 24, 1957     A. J. BUTTERWORTH     2,807,340
CHANGE-SPEED GEARS FOR AUTOMOBILES
Filed March 20, 1953     6 Sheets-Sheet 5

Inventor
Archibald J. Butterworth
By Young, Emery & Thompson
Attys.

Sept. 24, 1957 A. J. BUTTERWORTH 2,807,340
CHANGE-SPEED GEARS FOR AUTOMOBILES
Filed March 20, 1953 6 Sheets-Sheet 6
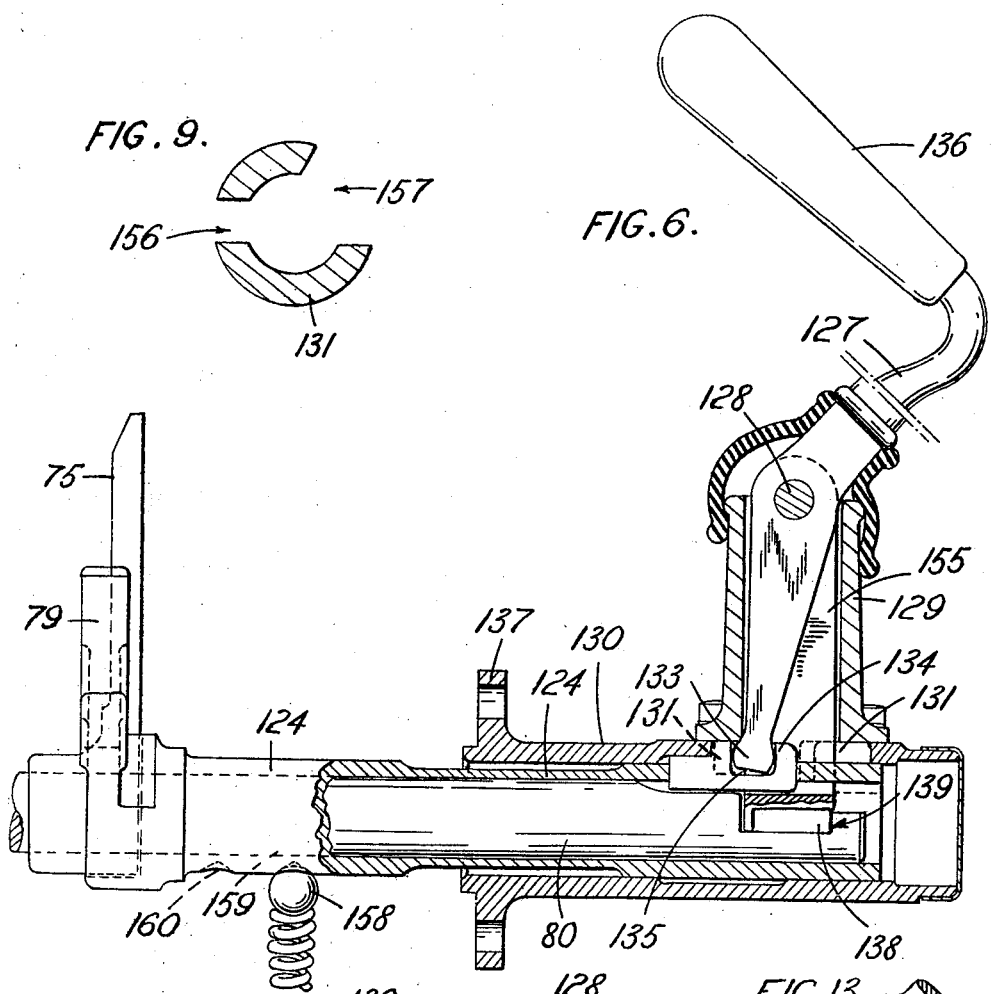
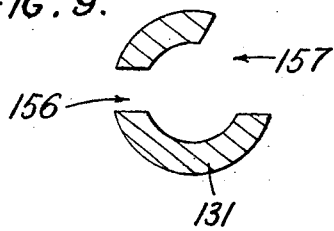
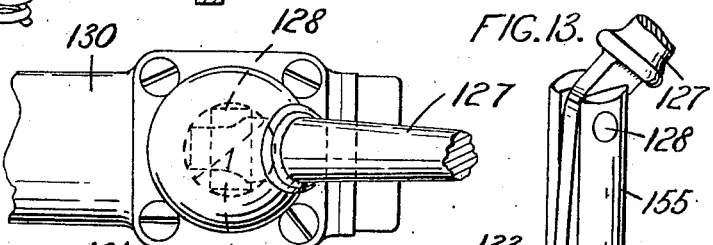
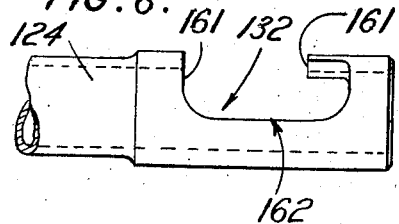
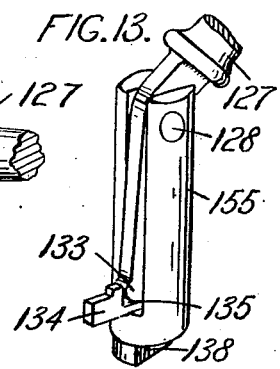
Inventor
Archibald J. Butterworth
By Young, Emery, & Thompson
Attys.

United States Patent Office 2,807,340
Patented Sept. 24, 1957

2,807,340

CHANGE-SPEED GEARS FOR AUTOMOBILES

Archibald James Butterworth, Frimley, England

Application March 20, 1953, Serial No. 343,637

9 Claims. (Cl. 192—3.5)

This invention relates to change speed gears particularly for racing automobiles but is also applicable to other kinds of vehicles.

In modern racing cars maximum speeds, rates of acceleration and cornering speeds have all reached such a high rate that it is frequently inconvenient and even dangerous to remove a hand from the steering wheel to change gear or preselect for a subsequent change if a self-change gear box is used. The final gear change, say from fourth to fifth, may be made for example at a speed as high as 140 miles per hour while traversing an ordinary closed road circuit.

An object of the invention is to provide a rapid change of gear ratio without the use of a hand gear shift lever or preselector lever.

A further object of the invention is to provide two foot pedals one of which may be employed for effecting a change so as to increase the gear ratio while the other may be employed for effecting a decrease in gear ratio.

A still further object of the invention is to provide a two pedal change speed control for a rectilinearly moving selector member by means of two ratchet mechanisms operating in opposite senses.

A still further object of the invention is to provide a gear box in which a rapid change can be obtained merely by the actuation of a single selector.

A still further object of the invention is to provide a gear box in which step by step movement of a selector member in one direction successively couples the gear wheels in one set of gear wheels to a shaft which set of gear wheels are in constant mesh with another set of gear wheels on a second shaft.

The following is a description of one form of change speed gear according to the invention suitable for use with a racing or other automobile, reference being made to the accompanying drawings in which:

Figure 2 is a section through the gear box on the bent line 2—2 of Figure 3,

Figure 6 is a sectional elevation of the reverse gear control mechanism,

Figure 7 is a plan of a part of the arrangement shown in Figure 6,

Figure 10:
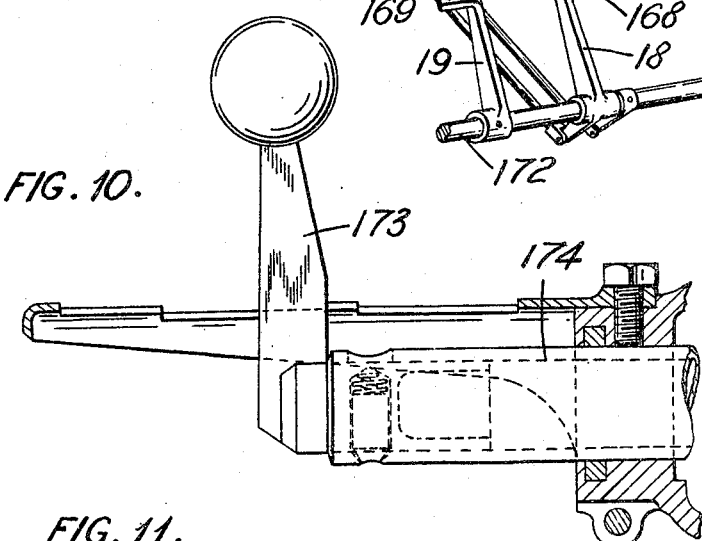
Figure 11:
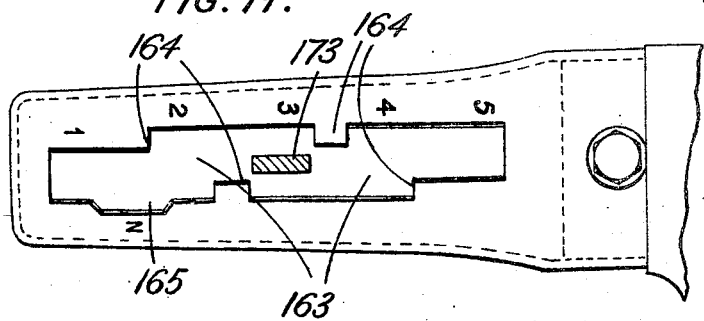

Figure 8 is a side elevation of the end of the tubular control shaft for the reverse gear, Figure 9 is a section on the line 9—9 of Figure 6 showing the spigot on the reverse lever mounting pillar, Figure 10 is a side elevation of an emergency change speed lever and gate, Figure 11 is a plan of the gate, Figure 12 is a similar view to Figure 2 of an alternative arrangement, and Figure 13 is a perspective view of the locking mechanism for a reverse gear lever.

Figure 1:
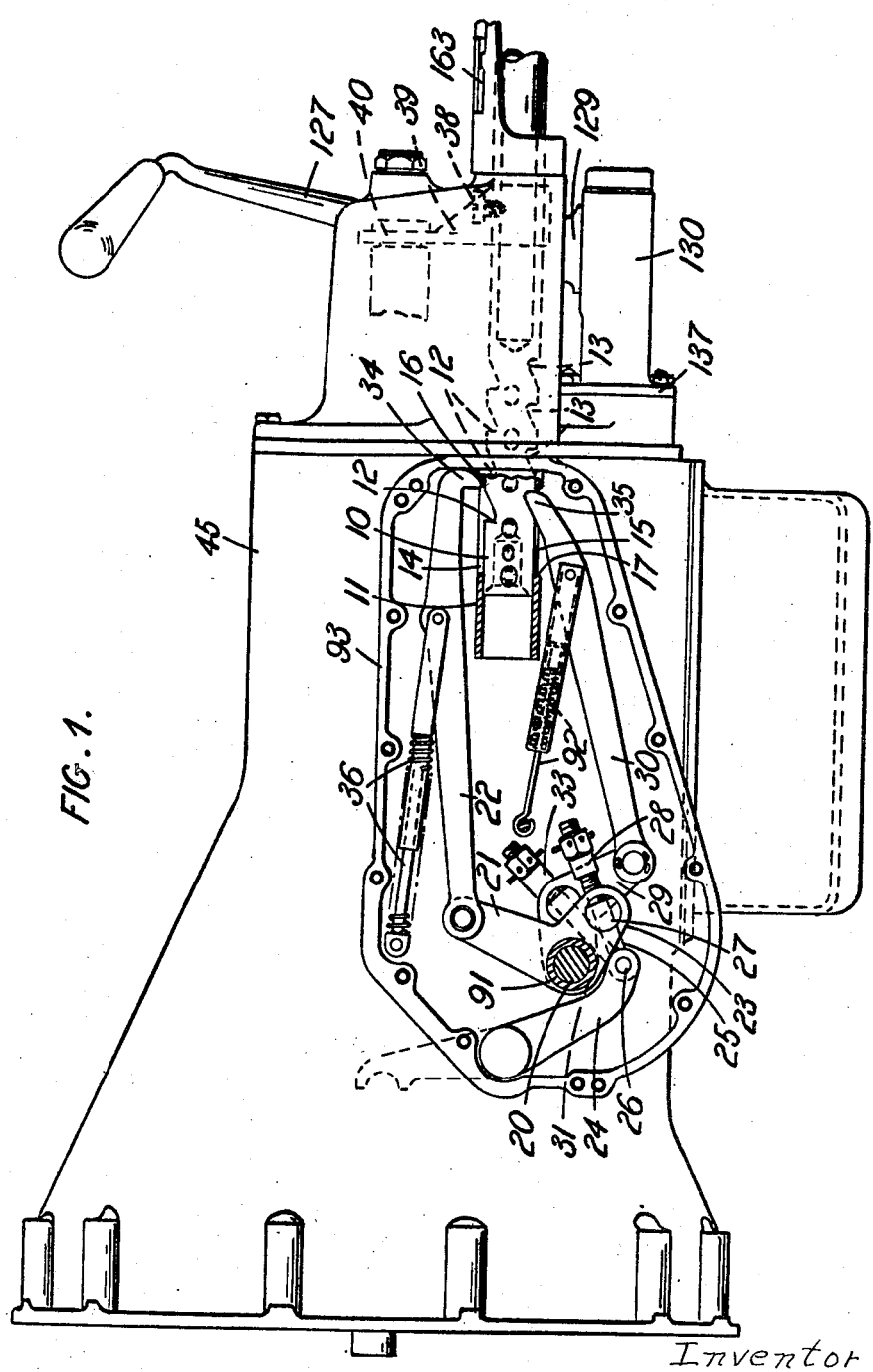
Figure 1 is a side elevation of the foot operated gear selector mechanism.
Figure 5:
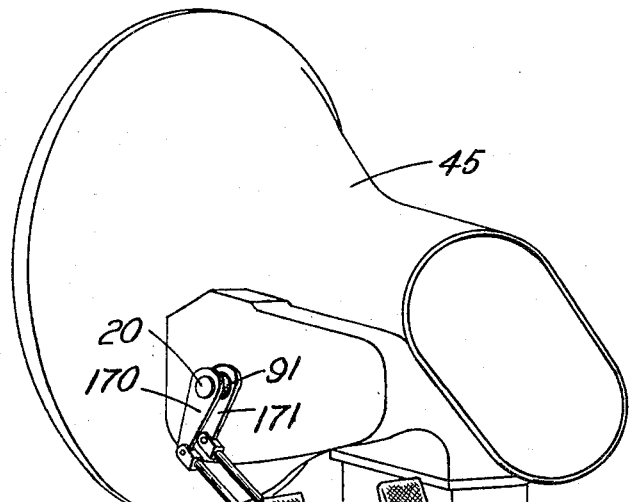
Figure 5 is a diagrammatic perspective elevation of the pedals.

Referring to the two-pedal selector mechanism shown in Figure 1 a selector operating bar 10 is mounted to reciprocate in a bearing 11 and is provided on the top and bottom edges thereof with oppositely directed ratchet teeth 12 and 13. The bearing is provided on opposite sides thereof with apertures 14 and 15 through which the ratchet teeth are exposed. One edge of the aperture 14 is bevelled as indicated at 16 while the opposite edge of the other aperture 15 is bevelled at 17. Two foot pedal levers 18 and 19 are mounted co-axially either on extensions of a shaft 20 and tubing 91 respectively as shown in Figure 1 or, as is likely to be more convenient in providing satisfactory positions for the controls, and as shown in Figure 5, are linked to short levers 170, 171 attached to the ends of the shaft 20 and tube 91, the pedals themselves being mounted on a cross shaft 172 which may conveniently pass under the gear box 45. Referring to the arrangement shown in Figure 1, the shaft 20 has secured to it a bell crank lever one arm 21 of which extends above the shaft 20 and has pivotally connected to it a pawl member 22 while the other arm 23 of the bell crank lever is connected to a clutch operating lever 24 by a swing bolt 25. The bolt is pivotally connected at 26 to the clutch lever 24 and passes freely through a fulcrum member 27 rotatable in the bell crank lever arm 23 and is provided at its other extremity with an adjustable abutment 28. The other pedal lever 19 has secured to it a cranked lever 29 the extremity of which extends beneath the shaft 20 and is pivotally connected to another pawl member 30. Another part of the crank lever 29 is connected to the clutch lever 24 by a swing bolt 31 which passes through a fulcrum member rotatably mounted in the crank lever and is provided with an adjustable abutment 33 in a similar manner to that described with reference to the bell crank lever. The two pawl members 22, 30 extend over the apertures 14 and 15 in the bearing 11 and are provided respectively with nose pieces 34, 35. Telescopic spring links 36 and 92 are connected between the two pawl members 22, 30 and a fixed part of the mechanism which spring links are arranged both to urge the nose pieces towards the ratchet teeth 12 and 13 and to return the mechanism to its disengaged position. Thus the spring means 36 urges the pawl member 22 to right and the spring means 92 urges the pawl member 30 to the left. It will be noted that apart from the levers linked to the foot pedals and the lever arm actuating the clutch all the above mentioned parts are located within a casing 93 disposed to one side of the gear box casing 45 which casing 93 is provided with a removable cover 165.

Since the extremities of the bell crank lever arm 21 and the cranked lever 29 are disposed on opposite sides of the shaft 20 movement of the pedal levers 18 and 19 in the same direction will move the pawl members 22 and 30 in opposite directions. The arrangement is such that when the pedal levers 18 and 19 are urged to the right hand end of the movement by their spring means, the pawl member 22 will be at the right hand end of the aperture 14 and resting on the bevel 16 out of engagement with the teeth while the nose 35 will be at the left hand of the aperture 15 resting on the bevel 17. In the position shown in the drawings the pedal lever 19 has been depressed to the left bringing the nose piece 35 into engagement with one of the ratchet teeth 13 and has urged the selector bar 10 to the right. In this position the first gear will have been engaged. When the pedal 19 is released the nose will move back again to the left hand end of the opening 15 and rest on the bevel 17.

Should it then be required to engage second gear the pedal 18 will be depressed bringing the nose piece 34 into engagement with the end tooth 12 and moving the selector bar to the left. Upon release the nose piece 34 will return to the bevel 16. Should the third gear require to be engaged the pedal 18 is again depressed and the nose piece 34 will come into engagement with the second tooth 12 and move the selector bar again to the left.

The first part of the movement to the left of each pedal actuates the clutch lever 24 so that the clutch is disengaged before the selector bar 10 is moved. When either of the pedals is moved it will transmit movement to the clutch lever through the swing bolt while the other swing bolt associated with the other pedal will slide idly through the fulcrum on that lever. For example it will be noticed that the swing bolt 25 has slid outwardly through the fulcrum 27.

The movement of the levers in the actuating mechanism may be arranged so that while the movement of the selector pawls is substantially proportional to the movement of the foot pedal, the movement of the clutch release lever is considerably greater during the first half of pedal travel than during the second, this effect being achieved by permitting that arm of the lever actuated by each gear change pedal, which is linked to the clutch release lever, to approach a "dead centre," with a consequent reduction in movement transmitted to the clutch release lever per degree of rotation of the gear selector cross shaft, and of the foot pedal attached or linked to it.

The above arrangement ensures that the clutch is fully freed before the gear selector is moved, without the danger of using up all the available travel of the clutch release mechanism, whilst actuating the gear selector pawl.

The end of the selector bar 10 has rigidly secured to it by means of a screw 38 a selector fork 39. The limbs 40 of the fork engage a circumferential groove 42 (see Figure 2) formed in an extension member 43 at the end of hollow main shaft 44. The external diameter of the extension member 43 may be slightly less than that of the hollow main shaft and may have a hole 41 bored therein smaller than the bore of the hollow shaft so that a reservoir of oil may build up in the hollow main shaft. A small passage 95 may extend from the hole 41 to the groove 42 for the purpose of lubrication. The hollow main shaft is rotatable and axially slidable in bearings 46, 47 mounted in a casing 45. The hollow main shaft is provided with internal splines 48 which are engaged by external splines 49 formed on the extremity of a driving shaft 50. The driving shaft 50 is restrained against axial movement and is supported by a bearing 51 and associated oil seal carried by a hollow extension 52 of the gear box casing 45. The driving shaft 50 is connected to the driven element of a clutch, the clutch being engaged and disengaged by the movement of the aforesaid clutch lever 24. In an alternative arrangement shown in Figure 12 the left hand end of the main shaft 44 is extended and is provided with external splines 96 which slidably engage splines 97 formed inside a hub portion 98 of one part 99 of the clutch. The hub portion 98 is provided with a rearward extension 100 which passes through an oil seal 101 which is pressed into the hollow extension 52 of the gear casing. In this case oil from the main gear box lubrication system is carried forward through the hollow shaft 44 and lubricates the splined joint between the hub member 98, and the main shaft 44.

The main shaft bearings 46 and 47 may consist of standard type ball-races into which bronze sleeves are pressed to permit the sliding action. Alternatively they may consist of roller-races running directly on the main shaft which then slides on the rollers themselves when gears are shifted. The rollers are restrained against axial movement by lips on the outer race in a known manner. This alternative arrangement is shown applied to the rear bearing in Figure 12. The rear face of the bronze thrust bush 110 (see Figure 2) may then bear against the forward face of the outer ring of the roller-race.

The front end of the elongated clutch hub 98 is attached to a nose-piece 102 which is formed with the journal 103. The journal engages a bearing 104 in the engine casing. When this alternative construction is used the main shaft is necessarily torsionally rigid and it is desirable therefore that a known type of torsionally resilient driven clutch member should be employed, to cushion the shock of instantaneous gear changes.

The arrangement shown in Figure 2 enables a shorter hollow main shaft 44 to be used, together with a rigid clutch driven disc (the small diameter of the connecting shaft 50 providing sufficient torsional resilience in itself).

In either of the above arrangements the hollow main shaft 44 is provided on its outer circumference with projecting dog teeth 53 and the diameter of the shaft at the roots and between the teeth is slightly larger than that of the remainder of the shaft. This slightly enlarged diameter is blended smoothly into the main diameter of the shaft on both sides of the row of teeth.

Rotatably mounted on the hollow main shaft is a set of different sized gear wheels 54, 55, 56, 57 and 58; the bores in the gear wheels are a close sliding fit over the larger diameter of the shaft at the roots of the dog teeth. Each of the bores is provided with a number of female splines 59 which may be engaged by the dog teeth, thus when any one gear wheel has been engaged by the dog teeth its inner periphery will be centralized by the larger diameter of the hollow main shaft between the roots of the teeth while when the gear wheels are not engaged by the dog teeth they are an easy running fit on the hollow main shaft 44. The gear wheels are spaced apart by rings 60, the internal diameters of which are larger than the major diameter of the dogs on the hollow main shaft and which rings fit in an easy running fit in circular recesses formed in the side faces of the gear wheels.

The gear wheels 54, 55, 56, 57, 58 are in constant mesh other gear wheels 65, 66, 67, 68, 69 all of which latter with the exception of 65, are permanently splined to a lay-shaft 70 rotatably mounted in bearings 71, 72 in the gear case 45.

The gear wheel 65 is axially slidable on the lay shaft and is provided with dog teeth 73 which are engageable with dog teeth on the lay shaft or on the adjacent wheel 66. The clutch between 65 and 66 is normally maintained engaged by a spring 74. The gear wheel 65 may be moved to the right against the action of the spring to disengage the clutch by a fork 75 (see Figures 2 and 6) which engages a face on one side on the gear wheel 65, so as to move the gear wheel against the action of the spring 74. The gear wheel 65 may also be moved to the right by a centrifugal governor shown diagrammatically at 86, noses on which engages slots in a part 76 connected to the gear wheel.

It will be appreciated that when top gear is engaged, the first speed pinion 54 would normally idle at a very high speed, being the product of engine speed multiplied by the overall gear-box reduction between the 5th and 1st speeds (in the case of the gear box shown in the drawings, and an engine speed of 7,000 R. P. M., this speed would be over 17,000 R. P. M.).

Such high speeds are undesirable, both on account of frictional losses and a danger of seizure.

Declutching may conveniently be arranged to occur at or near maximum speed in second gear. Centrifugal means are therefore provided for imparting axial movement to the pinion 65 so as to disengage it from the lay shaft. The gear wheel 54 with which the wheel 65 is in mesh is of sufficient width for meshing relationship to be maintained throughout the movement of the gear wheel 65.

Figure 3:
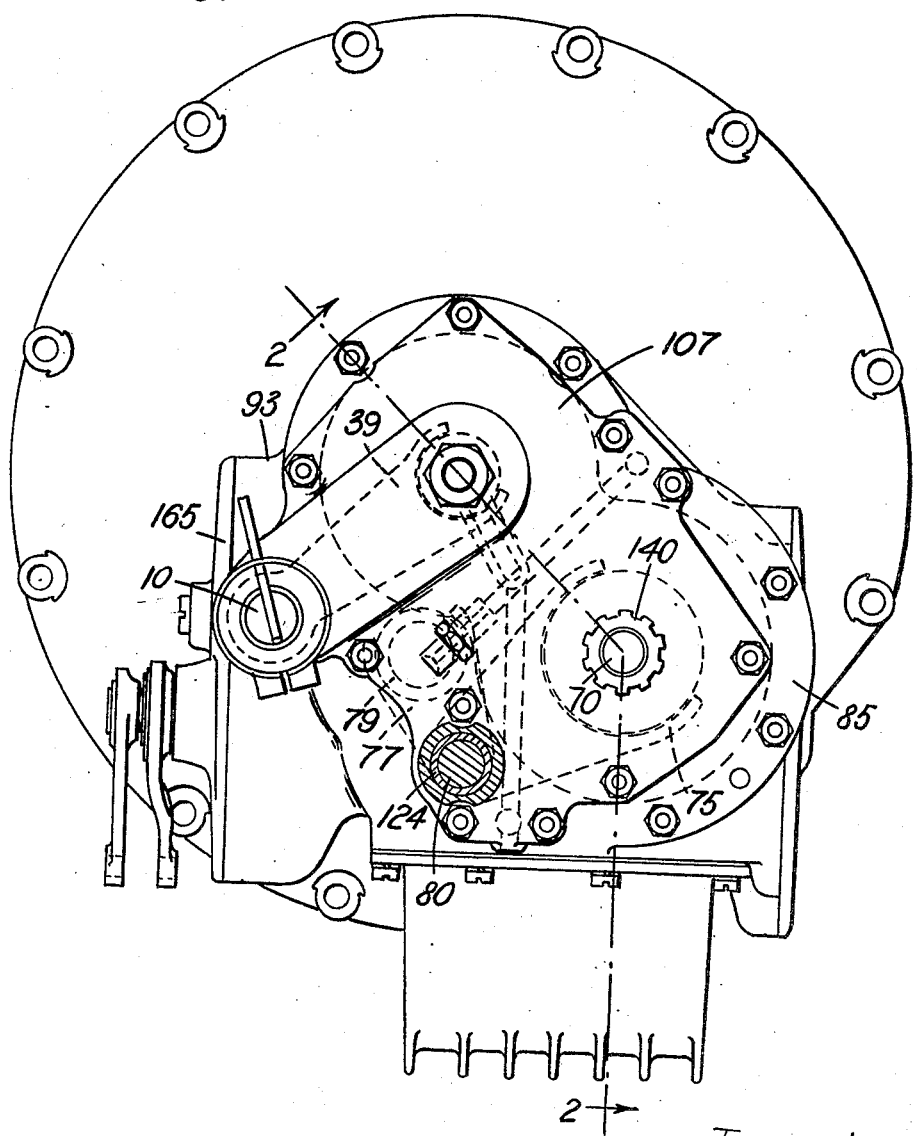
Figure 3 is an end elevation looking from the right hand of the gear box shown in Figure 2.
Figure 4:
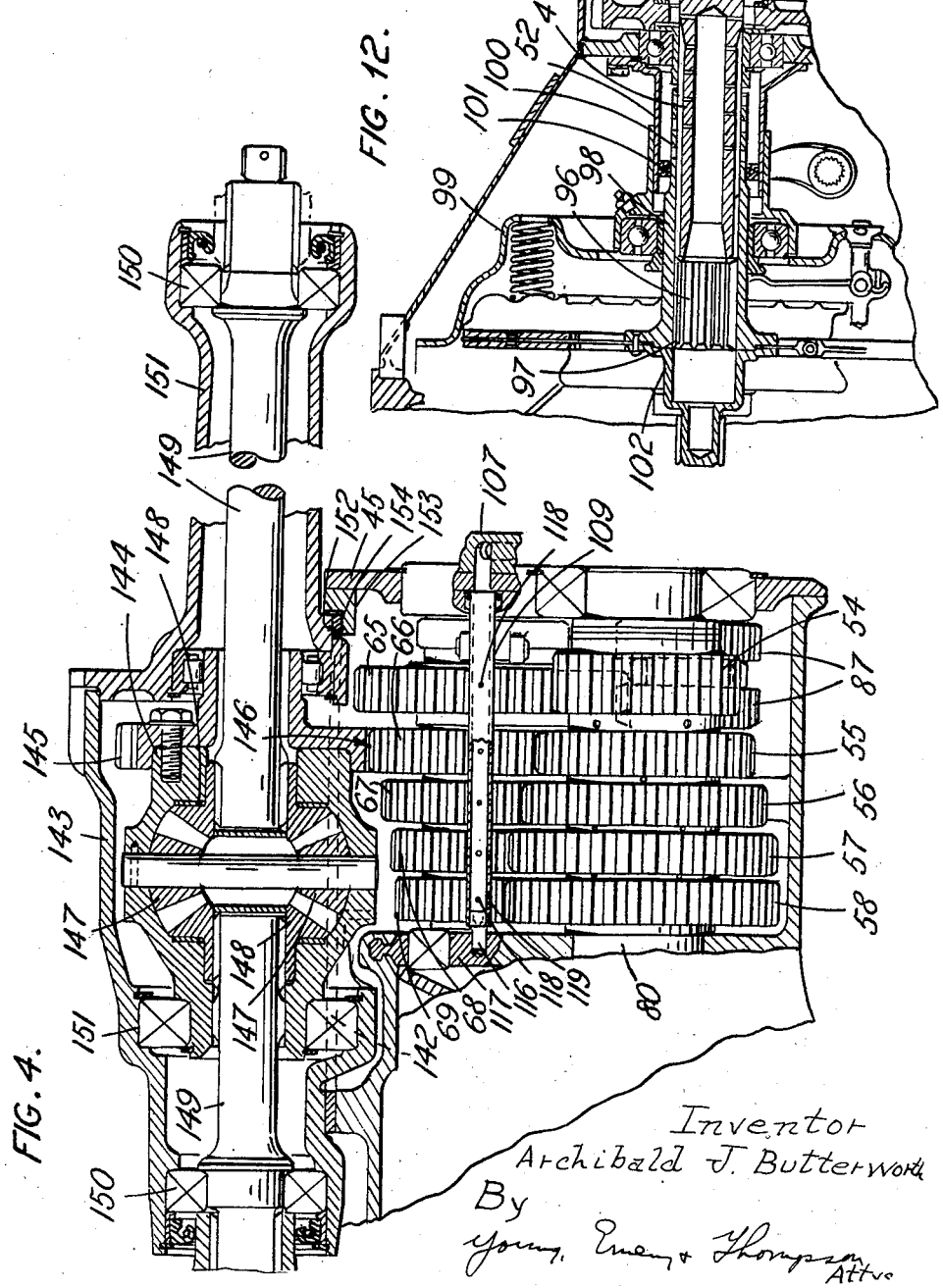
Figure 4 is a part under plan view of the gearing shown in Figure 2 and a part horizontal section through an associated transmission for driving the front and rear wheels of the vehicle.

It will be seen that the centrifugal throwout is so arranged that the spring force is applied only to those parts which rotate with the layshaft, so that it does not add any frictional restraint to the first speed wheel in the disengaged position. Advantage is taken of the facility for disengaging the first speed driven wheel 54, to provide a simple reverse mechanism. For this purpose a reverse gear wheel 87, Figure 4, rotatable and axially slidable on a spindle (not shown) and in its right hand position it is only in engagement with the gear wheel 65 while in its left hand position it is arranged to be both in engagement with the gear wheel 65 and with the second gear pinion 55 on the main shaft 44. In this latter position the gear wheel 65 is arranged to be declutched from the lay shaft. Under these conditions the drive is transmitted from the main driving shaft 50 through the gear wheel 54, the gear wheel 65, the reverse gear pinion 87 and through the gear wheels 55, 66 to the layshaft. The reverse gear pinion 87 may be moved axially by a suitable selector fork 79 (see Figure 3) which engages a circumferential groove in a part of the wheel 87. The selector forks 75 and 79 are attached to coaxially arranged shafts 80, 124 respectively, which are actuated by a single reverse gear lever 127 so that when one of the forks is moved to the left the other is moved to the right and vice versa and an interlock mechanism is provided (as hereinafter described) so that the fork 79 cannot be operated to move the reverse gear pinion 87 to the left until the gear wheel 65 has been de-clutched from the layshaft by moving that wheel to the right. A side wall of the gear casing 45 may be provided with an opening opposite the gear wheels 65, 66, 67, 68, 69 which may be closed by a cover plate indicated by the dotted lines 142 in Figure 4.

A feature of this gear box design is that owing to the sequential arrangement of gear changes the difference in velocity between adjacent gears at the time a change is made is always in the same sense. Advantage may be taken of this fact to form the dogs 53 and the slots with which they engage with chamfered faces so as to ensure their immediate engagement upon rapid depression of the selector pedals. Alternatively a similar effect may be obtained by staggering the male and female spline teeth, the effect then being that alternate teeth of each set are cut back to facilitate rapid engagement in a known manner.

The parts of the interlock mechanism are shown in Figures 6, 7 and 8 in the positions they assume when the reverse gear is established. The reverse gear lever 127 is mounted so as to be capable of rocking on a transverse spindle 128 and is also capable of rotating about a vertical axis. This is effected by arranging the spindle to be carried at the upper extremities of the arms 155 of a fork member rotatable within a hollow pillar 129. Thus the lever 127 may be referred to as a twist and pull lever.

The pillar is fixed to a bearing member 130 and provided with a spigot portion 131 which projects into a hole formed in the bearing member. The bearing member 130 is provided with a flange 127 which may be secured to the rear wall of the gear box. Axially slidable in the bearing member 130 is the tubular shaft 124 which imparts movement to the reverse gear pinion 87.

Slidably mounted in the tubular shaft is the shaft 80 which controls the clutching and de-clutching of the pinion 65 to and from the lay shaft.

The lower extremity 133 of the reverse control lever 127 is arranged to engage a socket 125 formed in the shoe 134 which shoe is disposed between the arms 155 of the aforesaid forked member. The shoe has a part which fits snugly between the faces 161 of a slot formed in the tubular shaft 124, thus by rocking the gear lever 127 about the transverse spindle 128 reciprocal movement is imparted to the tubular shaft 124, the shoe 134 moving backwards and forwards between the limbs of the fork member 155.

Spigot 131, at the bottom of the pillar 129, fits into a hole in the bearing member 130 and is of such depth that its lower surface is in the same plane as the bottom of the slot (or socket) 135 formed in the shoe 134. That part of the spigot, which protrudes into the bore of the bearing member 130, is machined away so as to remove obstruction to axial movement of the tubular shaft 124. It may conveniently be bored in the same operation as boring the bearing member 130 when assembled therewith. The spigot portion 131 is cut away forming a narrow slot 156 in which the shoe 134 may reciprocate, but from which it can be fully withdrawn when moved to the right of the position shown in Figure 6. When so moved it will lie between the faces of a larger slot 157 formed in the spigot member. So long as the shoe is in the slot 156 the gear lever 127 and fork member 155 cannot be rotated about a vertical axis, but as soon as the shoe has been withdrawn from the slot 156, rotation may be effected in an anticlockwise direction. The lower extremity of the fork member 135 is provided with a cam face 138 arranged to engage a face of a slot 139 formed in the shaft 80. The slotted part 161 of the tubular shaft 124 is so shaped as to permit the lower extremity of the fork member, carrying the cam face 138, to extend into the interior of the tubular shaft, and to rotate in the slotted porion.

As indicated above in Figure 6 the parts are shown in the positions they assume upon engagement of the reverse gear. Under these conditions rotation of the fork member 155 is prevented by reason of the shoe 134 having entered the slot 156 in the spigot 131 thus preventing the shaft 80 from being moved to the left and maintaining the gear wheel 65 free on the layshaft. When however the shoe 134 is moved to the right, the fork member may be rotated and the face of the cam 163, in being withdrawn from the face of the slot on the inner shaft 80, permits that shaft to be moved by the spring 7A to the left coupling the gear wheel 65 to the layshaft. This rotation of the fork member carries the shoe around with it and brings the end of the upper part of the shoe out of register with the slot 156, thus preventing rocking movement of the gear lever and reciprocal movement of the shoe when the gear wheel 65 is clutched to the layshaft.

An emergency hand control lever may also be provided for the forward speeds. For this purpose a lever 173 (see Figures 10 and 11) is mounted on a non-rotating extension 174 of the hollow main shaft 44 or on the selector bar 10. The lever is capable of a limited oscillation movement about the axis of the extension 174 but is maintained in a mid position by spring means (not shown). In this position the lever can move freely from one end to the other of a gate slot 163 and thus when the lever is not in use the gate does not interfere with the foot pedal gear change mechanism.

The sides of the gate are provided with projections or shoulders 164 and a recess 165 for facilitating the location of this lever for the various gears and neutral.

Where this type of gear box is fitted to a vehicle having two wheel drive say from the rear wheels, splines 140 may be formed on the rear of the lay-shaft and one flange of a universal joint and attached thereto, the other flange of the joint being secured to a propeller shaft.

In this case the rear cover is bored for a suitable oil-seal, bearing on the first said flange.

The same gear box may be readily employed for driving all four wheels of a vehicle. This is effected by replacing the aforesaid cover plate 142 by an assemblage comprising a differential casing 143 (see Figure 4) of the same general design as that described in U. S. No. 2,480,859 in which is rotatably mounted a planet wheel carrier 144. The carrier has secured to it a pinion 145 which extends through the aperture in the gear case 45 and meshes with the gear wheel 46. The planet wheels 147 on the planet carrier engage bevel wheels 148 on two half shafts 149, one half shaft extending forwardly for transmitting a drive to the front wheel and the other rearwardly for transmitting a drive to the rear wheels. The two half shafts are supported by bearings 150 at the ends of the axle casing 151 which latter constitute extensions of the differential casing 143. A part of the differential casing is provided with a flat face 152 disposed opposite a flat face 153 around the opening in the gear box casing 45. There may be disposed between these two flat faces a packing 154 and this enables the rapid change to be made of the gear ratio between the half shaft 149 and the gear box drive, merely by replacing the gear wheel 145 by one of a different size and by suitably selecting the thickness of the packing 154.

It will be appreciated with this form of gear box that, when a gear is changed, the mass to be synchronised with the next gear selected consists only of the hollow shaft 44, the shaft 50 and the driven elements of the engine clutch. Owing to the small mass and radius of gyration of these parts, little shock will result from a rapid change.

The gear box is pump lubricated. Briefly, a gear type oil pump 103 is driven by a vertical shaft 104 and worm gearing 105 from the front of the lay-shaft 70. The pump sucks oil from the separate sump 106 attached to the base of the main casing and pumps it through a horizontal drilled passage into drillings in the rear cover plate 107.

It is there distributed to two tubular jet galleries 108, 109. One of these 108 passes in the hollow main shaft 44, Figure 2, through the hole 41 in the extension 43 leaving an annular space between them. The gallery 108 has holes 111 as far as possible opposite the mid-point of each gear wheel, and also opposite the bronze bushes 110 inside the first gear pinion 54 and the bush 47. However in the construction shown in Figure 2 it is not convenient to extend this jet gallery 108 as far as the front main-shaft-bearing 112 or to the 5th and 4th gear wheels, 58, 57 so in this alternative, the shaft 50 is bored at 62 and a diagonal drilling 113 carried from the end of the bore to the forward end of the splines 49 so that oil from a jet 114 drilled axially in the extreme forward end of the jet gallery 108 can be carried to these forward positions.

Small holes 63 are drilled in the hollow main shaft 44 itself to line up approximately with the jets 111 in the oil gallery pipe for each gear position, also the crest diameter of the splines 49 is reduced for a sufficient distance from the rear end to ensure delivery of oil to the fourth speed gear wheel 57.

The other jet gallery 109 (see Figure 4) is situated above the lay-shaft and is supported by a short, solid extension at its forward end entering a blind hole drilled in the gear casing front wall 117. This gallery has one downward vertical jet hole 118 and one lateral hole 119 opposite the mid-point of each gear wheel; these direct a jet of oil onto the gear teeth shortly after they have emerged from meshing with one another.

The object of this arrangement is to permit centrifugal force to fling the excess oil from each gear tooth before it again meshes, while leaving a sufficient film of oil for good lubrication but avoiding the oil-trapping and churning which is responsible for a great deal of the power loss in a conventional "wet sump" gear box. Provision is made for an oil pressure gauge if required. The oil flung from the gear wheels or draining from between the thrust rings and the gear wheels is returned to the sump 106 by a number of holes 120 (see Figure 2) drilled in the bottom wall of the gear casing 45.

The bush 120 fitted to the first speed driving wheel 58 is lubricated by oil collected from the front cover 121 below the front-main-shaft-bearing 47 and thence delivered into the hollow lay-shaft through the passage 123. The right-hand end of the hollow main shaft 44 is also open to the inside of the rear cover, through the aforesaid annular space between the bore of extension 43 and the gallery pipe 108. The reduction in diameter at the open end of each shaft serves to trap a reservoir of oil, the surplus then spilling over.

As will be seen from Figure 5, the extremities 168 and 169 of the foot pedals 18 and 19 are so arranged that the operator's foot can normally rest on the floor between the levers 18 and 19 and yet can be easily brought into position to engage either of the extremities. The object of this arrangement is twofold. Firstly, it permits reduction of the space between the pedals to little more than the width of the driver's foot, and secondly, it guides the driver's foot without obstruction.

I claim:

1. A change speed gear comprising a rectilinearly moving selector member, a movement of which in one direction is adapted to increase the gear ratio between an input and output shaft of a gear box and movement in the opposite direction is adapted to decrease the ratio, two movable actuating members and a uni-directional transmission between each actuating member and said selector member, one adapted upon successive movement thereof to move the selector member step-by-step only in one direction, and the other uni-directional transmission being adapted to move the selector mechanism step-by-step in the opposite direction.

2. A change of speed gear according to claim 1 wherein said uni-directional transmissions comprise two oppositely acting ratchet mechanisms connected between the two actuating members and the selector member, whereby successive oscillations of either actuating member imparts step-by-step movement to the selector member and means for disengaging each ratchet mechanism at one limit of movement of its lever.

3. A change speed gear according to claim 1 wherein said two actuating members are operated respectively by or are linked to two foot pedals mounted side by side to swing about the same axis and which actuating members have pivotally connected to them pawls for engaging respectively oppositely directed ratchet teeth on the rectilinearly moving selector member and means for disengaging each pawl from its teeth at one limit of movement of its foot pedal.

4. A change speed gear according to claim 1 in which the rectilinearly moving selector member is mounted in bearings and has two sets of oppositely directed ratchet teeth thereon and in which the two actuating members have noses thereon adapted respectively to engage said sets of teeth and further comprising means for disengaging the pawl at one limit of movement of its actuating member.

5. A change speed gear comprising a selector bar mounted in a bearing constraining the bar to move rectilinearly and having a spring-loaded detent and groove mechanism to retain it in the several gear positions, the movement of the bar in one direction being adapted to increase the gear ratio, while movement in the opposite direction decreases the gear ratio, sets of ratchet teeth on opposite sides of the bar, the teeth in one set being oppositely directed to the other set of teeth, two foot pedals mounted to swing about an axis transverse to said bar, a link pivotally connected to a part moving with one pedal on one side of said axis, and provided with a nose for engaging the teeth in one of said sets, another link pivotally connected to a part moving with the other pedal on the opposite side of said axis and having a nose at its end for engaging the teeth of the other set and loading means for urging the noses towards their respective sets of teeth and means for disengaging each nose from its set of teeth at one limit of movement of its foot pedal.

6. A change speed gear according to claim 1 and comprising a clutch control member and means for connecting the two actuating members independently to said clutch control lever so that the clutch is actuated before the selector member.

7. A change speed gear comprising a selector bar mounted in a bearing constraining the bar to move rectilinearly, the movement of the bar in one direction being adapted to increase the gear ratio, while movement in the opposite direction decreases the gear ratio, sets of ratchet teeth on opposite sides of the bar, the teeth in one set being oppositely directed to the other set of teeth, two foot pedals mounted to swing about an axis tranverse to said bar, a link pivotally connected to a part moving with one pedal on one side of said axis, and provided with a nose for engaging the teeth in one of said sets, another link pivotally connected to a part moving with the other pedal lever on the opposite side of said axis and having a nose at its end for engaging the teeth of the other set and loading means for urging the noses towards their respective sets of teeth and means for disengaging each nose from its set of teeth at one limit of movement of its foot pedal, a clutch control lever mounted to swing about an axis parallel to that of the foot pedal levers, a second link pivotally connected between a part moving with each foot pedal and the clutch lever so that movements applied to the foot pedals in the same direction move the clutch lever in the same direction and before a nose engages a tooth.

8. A change speed gear according to claim 1 wherein said actuating members are operated respectively by two foot pedals having lever arms spaced apart sufficiently to permit the foot of the operator to pass between them and having pedal portions extending outwardly from their extremities and which actuating members have pivotally connected to them pawls for engaging respectively oppositely directed ratchet teeth on the selector member and means for disengaging each pawl from its teeth at one limit of movement of its foot pedal.

9. A change speed gear comprising a selector member, movement of which in one direction is adapted to increase the gear ratio between an input and output shaft of a gear box and movement in the opposite direction is adapted to decrease the ratio, two foot pedals, a uni-directional transmission between each foot pedal and selector member, one adapted upon successive movement thereof to move the selector member step-by-step in one direction only, and the other uni-directional transmission being adapted to move the selector mechanism step-by-step in the opposite direction, a hand control member arranged to move with the selector member along a gate having projections and recesses thereon engageable by the hand control member, a spring mounting for the hand control lever tending to maintain it in a position in the gate so that it may move along the gate clear of said projections and recesses.

References Cited in the file of this patent

UNITED STATES PATENTS

| | | |
|---|---|---|
| 2,465,832 | Banker | Mar. 29, 1949 |
| 2,512,907 | Abey | June 27, 1950 |
| 2,531,582 | Meyers | Nov. 28, 1950 |
| 2,549,884 | Borland | Apr. 24, 1951 |